United States Patent [19]

Jubb

[11] 3,730,644

[45] May 1, 1973

[54] GAS TURBINE ENGINE

[75] Inventor: Albert Jubb, Kenilworth, England

[73] Assignee: Rolls Royce Limited, Derby, England

[22] Filed: June 23, 1970

[21] Appl. No.: 49,118

[30] Foreign Application Priority Data

June 26, 1967 Great Britain.....................32,368/69

[52] U.S. Cl....................................416/95, 416/244
[51] Int. Cl.................................................F01d 5/08
[58] Field of Search......416/95–97, 90, 244; 415/115

[56] References Cited

UNITED STATES PATENTS

| | | |
|---|---|---|
| 2,657,008 | 10/1953 | Atkinson.................................416/97 |
| 2,801,792 | 8/1957 | Lindhagen et al. ..............416/96 UX |
| 2,656,147 | 10/1953 | Brownhill et al. ......................416/97 |
| 2,684,831 | 7/1954 | Grantham .............................416/97 |
| 2,858,103 | 10/1958 | Waugh ...................................416/97 |

FOREIGN PATENTS OR APPLICATIONS

| | | | |
|---|---|---|---|
| 1,017,511 | 9/1952 | France ...................................416/95 |
| 801,689 | 9/1958 | Great Britain.........................416/95 |
| 335,915 | 2/1936 | Italy ......................................416/95 |
| 956,822 | 1/1957 | Germany...............................416/95 |
| 1,043,718 | 11/1958 | Germany...............................416/95 |
| 742,288 | 12/1955 | Great Britain.........................416/95 |
| 789,197 | 1/1958 | Great Britain.........................416/95 |
| 73,554 | 11/1953 | Netherlands........................415/115 |

Primary Examiner—Everette A. Powell, Jr.
Attorney—Cushman, Darby & Cushman

[57] ABSTRACT

An industrial gas turbine engine comprises a multi-stage axial compressor, combustion equipment, a multi-stage compressor driving turbine, a power turbine and an exhaust duct, the compressor driving turbine being provided with cooling means to cool the blades of said turbine. The cooling means comprises a flow of cool air from the compressor which flows onto the surface of each turbine rotor blade through slots in the rotor rim. The cool air also flows over the surface of the turbine rotor between adjacent blades and the space between adjacent blades is filled with a honeycomb material, the cells of which constitute ducts for the flow of cooling air. The stator vanes of the compressor driving turbine are cooled both by air from the compressor and heat exchange means which comprises in a closed sodium filled loop, a pump, a coil in the cool air delivered by the compressor, a coil in each stator vane and a coil in the exhaust duct.

5 Claims, 4 Drawing Figures

INVENTOR
ALBERT JUBB

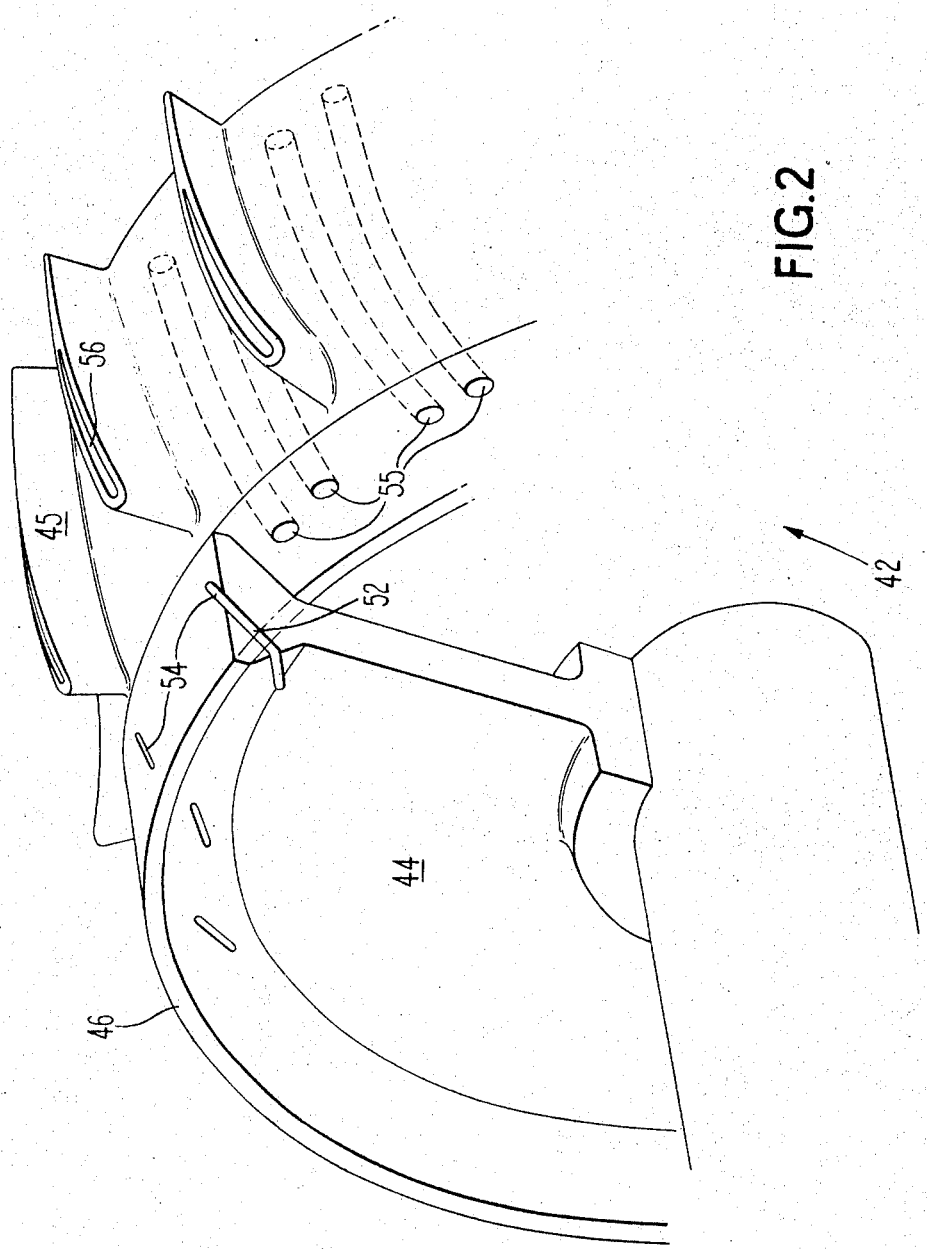

GAS TURBINE ENGINE

This invention relates to gas turbines and is particularly, but not exclusively, concerned with a gas turbine for use in an industrial gas turbine engine.

According to the present invention a gas turbine comprises a rotor, a row of equi-angularly spaced apart rotor blades secured to the rotor and first cooling fluid supply means adapted to direct cooling fluid at the leading edge of each rotor blade so as to form on each rotor blade a layer of the cooling fluid which extends over at least a major proportion of the surface of the rotor blade.

In a preferred embodiment of the invention, there is provided second cooling fluid supply means adapted to direct cooling fluid into the spaces between adjacent rotor blades so as to form a layer of the cooling fluid on those parts of the surface of the rotor between the rotor blades.

The rotor may have at least one further row of equi-angularly spaced apart rotor blades secured thereto downstream of the first-mentioned row; in this case the rotor blades of the or each further row may be positioned to receive cooling fluid which has passed over the rotor blades of the first-mentioned row, or preferably, the or each further row of rotor blades may be provided with respective first and second cooling fluid supply means similar to those associated with the first-mentioned row of rotor blades.

The or each first cooling fluid supply means preferably includes a respective slot positioned in the radially outer surface of the rotor in front of the leading edge of each rotor blade, each slot communicating with the interior of the rotor.

The slots may be arcuate in plan view.

The or each second cooling fluid supply means preferably includes a plurality of ducts within the rotor, extending approximately parallel to the mean chord lines of the rotor blades, each duct communicating with the interior of the rotor.

The majority of the ducts preferably extend through relatively low stress areas of the rotor between points to which adjacent rotor blades are secured, and may be constituted by incorporating honeycomb type structure in said low stress areas of the rotor.

Preferably at least some of the ducts communicate with the radially outer surface of the rotor so as to discharge the cooling fluid in approximately the same direction as, but at a small acute angle to, the direction of flow of the working fluid of the turbine, whereby to form said layer of cooling fluid on those parts of the surface of the rotor between the rotor blades.

The rotor blades may also be provided with internal cooling passages adapted to be supplied with the cooling fluid.

Preferably, the gas turbine is provided upstream of the first-mentioned row of rotor blades and if appropriate between each adjacent row of rotor blades, with a row of equi-angularly spaced apart stator blades secured at their radially outer ends to a casing coaxial with the turbine. In this case the casing may be provided with first cooling fluid supply means which is adapted to direct cooling fluid at the leading edge of each stator blade of at least the upstream row of stator blades so as to form on each stator blade a layer of the cooling fluid which extends over at least a major proportion of the surface of the stator blade, and may also be provided with second cooling fluid supply means adapted to direct cooling fluid into the spaces between adjacent stator blades of at least the upstream row of stator blades so as to form a layer of the cooling fluid on those parts of the internal surface of the casing between the stator blades.

The radially outer ends of the rotor blades and/or the radially inner ends of the stator blades may have labyrinth seals formed thereon, which seals are respectively adapted to co-operate with the internal surface of the casing and the external surface of the rotor respectively so as to reduce the flow of working fluid across the tips of the blades.

The invention also includes a gas turbine engine comprising, in flow series, compressor means, combustion means and a gas turbine in accordance with any of the preceding statements of invention.

In one embodiment of the invention, the cooling fluid is constituted by gas, e.g. air, compressed in the compressor means.

Thus the combustion means may include a first zone or zones connected to receive compressed air from the compressor means and a second zone or zones adapted for the combustion of fuel in compressed air received from the first zone or zones, the cooling fluid being constituted by gas from said first zone or zones.

There may be provided auxiliary combustion means in said first zone or zones, arranged to heat at least the cooling fluid. Alternatively and preferably, there may be provided an exhaust heat exchanger connected to receive the combustion products exhausted by the gas turbine engine in heat exchange relationship with a heat exchange liquid such as a liquid metal and means for pumping the liquid through heat exchange means in the first zone or zones and then optionally through heat exchange means adjacent the stator blades whereby to cool the latter.

The invention will now be described by way of non-limitative example only, with reference to the accompanying drawings, in which:

FIG. 2 is a perspective view of part of the gas turbine engine of FIG. 1:

Figure 1:
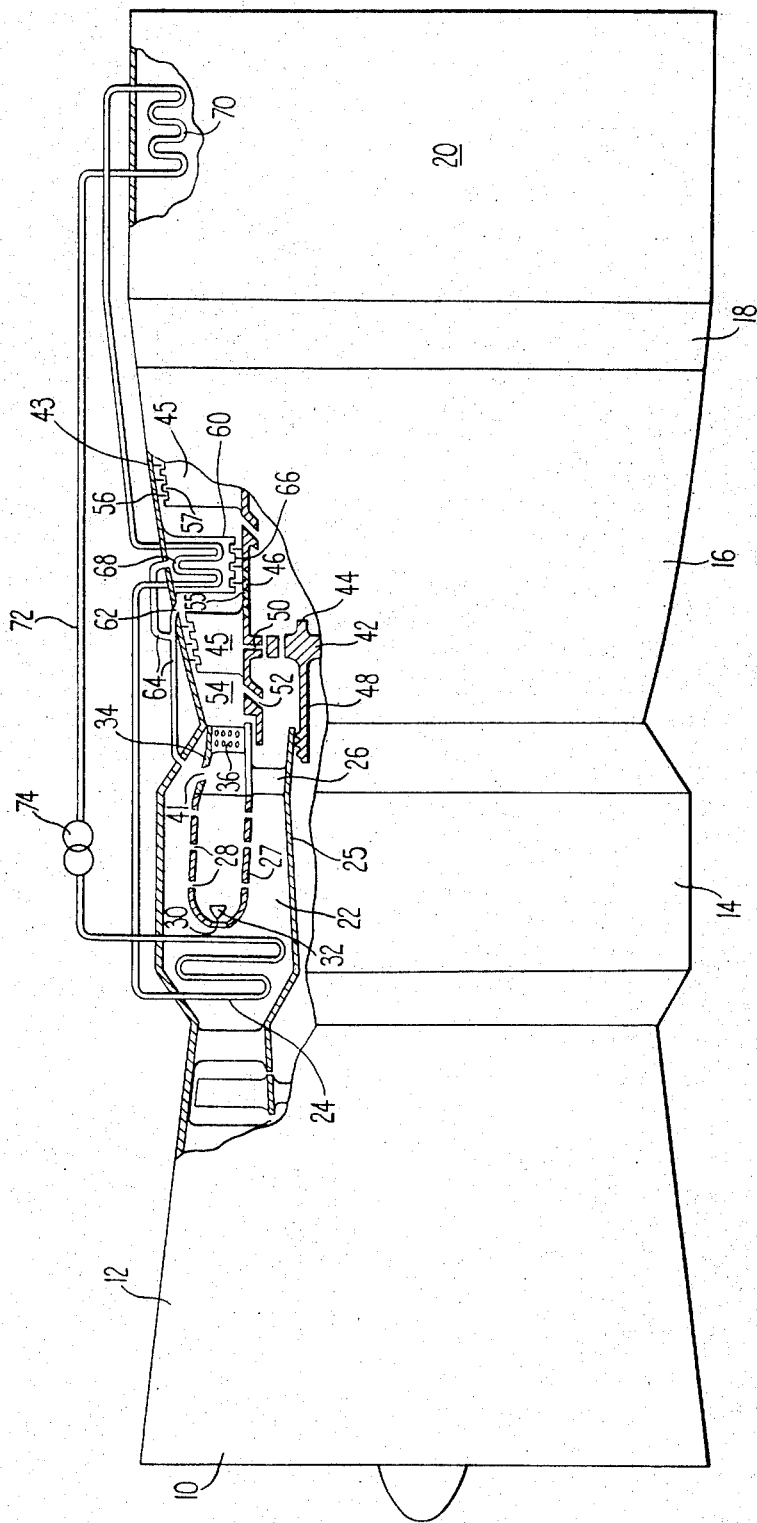
FIG. 1 is a diagrammatic part-sectional view of a gas turbine engine provided with a gas turbine in accordance with the present invention.

Referring to FIG. 1, the gas turbine engine comprises, in flow series, an air inlet 10, an axial flow compressor 12, combustion equipment 14, an axial flow turbine 16 drivingly connected to the compressor 12 by a shaft (not shown), a free power turbine 18 adapted to be drivingly connected to a load (not shown) and an exhaust duct 20.

The combustion equipment 14 comprises a plurality of combustion chambers 22 which are equi-angularly spaced apart about the axis of the engine. The upstream ends of each of the chambers 22 communicate with the outlet of the compressor 12 and contain respective heat exchanger coils 24, arranged in parallel, while the downstream ends communicate with an annular outlet 25 via an annular array of guide vanes 26. Each of the chambers 22 also contains a flame tube 27 downstream of the respective heat exchanger coil 24, the flame tubes 27 being spaced from their respective chambers 22 and communicating therewith by way of perforations 28. Each flame tube 27 also has an air inlet 30 communicating with the chamber 22 at its upstream end, contains a burner 32 connected to be supplied with fuel by means not shown, and has a downstream end 33 which communicates with an annular outlet 34 arranged coaxially around the outlet 25.

The outlet 34 communicates with the turbine 16 via an annular array of stator blades constituted by hollow nozzle guide vanes 36, the interiors of which communicate with a respective one of the chambers 22. Arcuate slots 41 are provided in the radially outer wall of the outlet 34 upstream of the leading edges of each of the vanes 36, the slots 41 communicating with the chambers 22.

The turbine 16 comprises a rotor 42 coaxially mounted within a substantially cylindrical casing 43 and consisting of a number (typically two)of two) of spaced discs 44 each having a row of equi-angularly spaced apart hollow turbine blades 45 welded to its periphery. The discs 44 are perforated mainly in their areas of low stress concentration, i.e. between the blade attachment points, and are provided with axially extending flanges 46 about their entire peripheries, the flanges 46 of adjacent discs 44 being welded together to form a drumlike turbine rotor assembly.

The upstream disc 44 is provided with an upstream-projecting annular flange 48 positioned coaxially within the flange 46, and the flanges 46, 48 sealingly co-operate with the external and internal boundaries respectively of the annular outlet 25 to provide communication between the chambers 22 and the interior of the rotor 42. The flanges 46 are provided with a number of equiangularly spaced apart substantially radially directed passages 50 which communicate between the interior of the rotor 42 and the interiors of each of the blades 45, and with a further number of equiangularly spaced apart passages 52 which extend at an angle of about 45° to the axis of the rotor 42 and which communicate between the interior of the rotor 42 and respective arcuate slots 54 provided in the radially outer surface of the rotor 42 in front of the leading edge of the blades 45 (see FIG. 2).

Those parts of the flanges 46 between adjacent blades 45 and between adjacent rows of blades 45 are provided with a large number of small passages 55 which communicate between the interior and the radially outer surface of the rotor 42. The axes of the passages 55 are disposed at a small acute angle, typically less than 10°, to the direction of flow of the working fluid in the turbine 16.

The blades 45, of which there are typically 17, are made from welded sheet metal and are relatively short: typically, their height is about one third of their chord. The radially outer end of each blade 45 is provided with an outlet 55 which communicates with the interior of the blade, and is further provided with a diagrammatically illustrated labyrinth seal 57 which co-operates with the internal surface of the casing 43 so as to reduce the flow of working fluid across the tip of the blade 45.

Between each pair of adjacent rows of turbine blades 45 is provided a row of equiangularly spaced apart hollow stator blades 60, the radially outer end of each of which is secured, by welding or other suitable means, to the casing 43. The casing 43 is provided with respective slots 62 which are similar in shape to the slots 54 and positioned in front of the leading edge of each of the stator blades 60 and which communicate with a respective one of the chambers 22 via ducts 64. The interiors of the stator blades 60 also communicate with a respective one of the chambers 22 via the ducts 64. It will be appreciated that the ducts 64 may be constituted by channels formed within the wall of the casing 43. Those parts of the casing 43 between adjacent blades 60 and between adjacent rows of blades 60 are provided with a large number of small passages (not shown) which are similar to the passages 55 and which also communicate with a respective one of the chambers 22.

The blades 60 are made from welded sheet metal and their radially inner ends are provided with respective outlets (not shown) and with diagrammatically illustrated labyrinth seals 66 which co-operate with the radially outer surface of the flanges 46 so as to reduce the flow of working fluid across the tips of the blades 60. The radially outer portion of each of the blades 60 contains a respective heat exchanger duct 68 which is arranged in a flow path between the common outlet of the heat exchanger coils 24 and the inlet of a heat exchanger coil 70 mounted in the exhaust duct 20.

The outlet of the heat exchanger coil 70 is connected to the common inlet of the heat exchanger coils 24 by means of a duct 72 containing a pump 74.

In operation, air compressed in the compressor 12 enters the chambers 22 and flows over the heat exchanger coils 24 before a portion thereof enters the respective flame tubes 27 to support the combustion of fuel. The combustion products in the flame tubes 27 are diluted by air from the respective chambers 22 via the holes 28 and pass via the nozzle guide vanes 36 into the turbine 16. The combustion products are expanded in the turbine 16, which thus drives the compressor 12, and further expanded in the power turbine 18 before passing into the exhaust duct 20. Residual heat is extracted from the combustion products in the exhaust duct 20 by the heat exchanger coil 70, which is adapted for the flow of a liquid metal heat exchanger fluid such as sodium.

The heated sodium is pumped by the pump 74 to the heat exchanger coils 24, where it injects heat into the air in the chambers 22, before returning to the heat exchanger coils 70 via the heat exchanger ducts 68. The sodium flowing through the ducts 68 is relatively cool and thus serves to cool the radially outer portions, i.e. the attachment points, of the stator blades 60.

The nozzle guide vanes 36, of which there are typically 18, are cooled internally by air from the chambers 22, and are cooled externally by air from the chambers 22 which is directed by the slots 41 against the leading edges of the vanes so as to form a cooling layer over the surface of each vane. The stator blades 60, of which there are also typically eighteen in each row, are cooled similarly to the vanes 36, that is internally by air received via the ducts 64 from the chambers 22 and externally by air from the chambers 22 which passes through the ducts 64 and is directed by a respective one of the slots 62 against the leading edge of each blade. Thus the slots 41 and 62 are so dimensioned shaped and positioned that each produces on its respective vane 36 or stator blade 60 a layer of relatively cool air which extends over substantially the whole of the surface of the blade.

In an alternative construction (not shown) the stator blades 60 are externally cooled by increasing the amount of cooling air supplied by the slots 41 to the nozzle guide vanes 36 so as to set up "streaks" of relatively cool air through the turbine 16 and positioning the blades 60 in the "streaks". In a further alternative construction (not shown) the stator blades 60 are externally cooled by arranging for the cooling air supplied to the interior of each blade to be discharged from a leading edge slot so as to flow over both flanks of the blade.

The internal surface of the casing 43 is cooled by air supplied via the small holes therein from the chambers 22. The small holes are arranged so that the cooling air passing therethrough enters the working portion of the turbine 16 in the same direction as, and at a small angle to, the direction of flow of the combustion products, thus producing a layer of cooling air which covers substantially the whole of the internal surface of the casing 43.

Air from the chambers 22 also passes, via the outlet 25, into the interior of the rotor 42. The rotor blades 45 are internally cooled by air received via the passages 50 from the interior of the rotor 42 and are externally cooled by air which flows through the passages 52 so as to be directed by a respective slot 54 against the leading edge of each blade. As already stated, the slots 54 are arcuate in plan view, the exact position, shape and dimensions of each slot being chosen to produce on its respective rotor blade 45 a layer of relatively cool air which extends over substantially the whole of the surface of the blade. If necessary, one or more further small holes or slots (not shown) may be provided near the attachment point of each blade 45 to augment the effect produced by the slots 54, since there is a tendency for the relatively cool air supplied by the slots 54 to centrifuge outwards in preference to the hot combustion products.

In an alternative construction (not shown), external cooling of the rotor blades 45 is achieved by increasing the flow capacity of the slots 54 of the upstream row of rotor blades 45 so as to produce rotating "streaks" of relatively cool air through the turbine 16, and positioning the blades 45 of the following row (or rows) to lie in the "streaks". In a further alternative construction (not shown) the rotor blades 45 in the rows downstream of the upstream row are conventionally internally cooled by any known means, since they are subjected to lower temperatures than the upstream row.

The radially outer surface of the rotor 43 is cooled by air supplied via the small passages 55 from the interior of the rotor. The passages 55 inject the cooling air into the working portion of the turbine 16 at a small angle to the direction of flow of the combustion products therein so as to form a layer of the cooling air which covers substantially the whole of the external surface of the rotor 43 between the blades 45.

Figure 4:
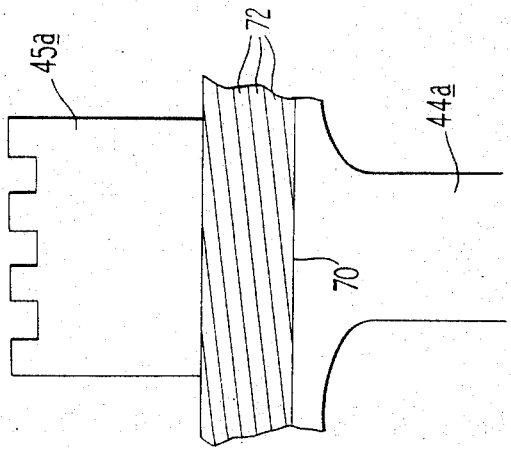
FIG. 4 is a section on the line 4—4 of FIG. 3.
Figure 3:
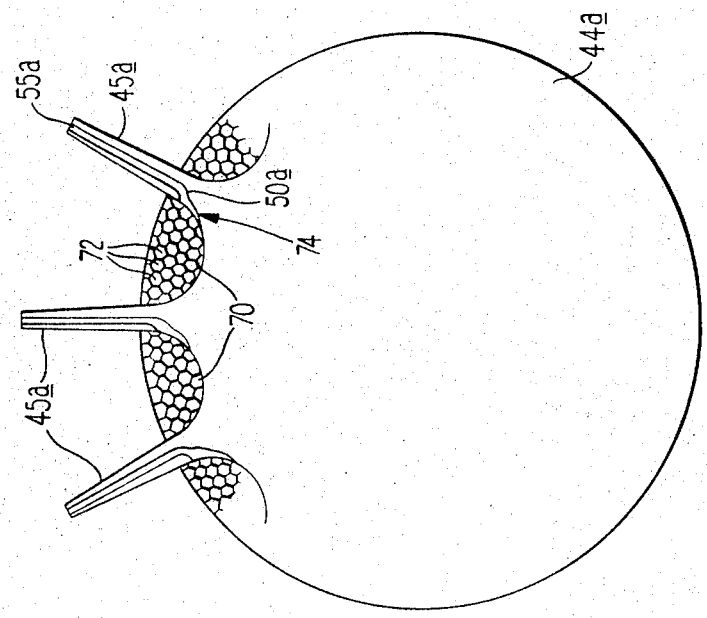
FIG. 3 is a diagrammatic sectional view of a further embodiment of a gas turbine in accordance with the present invention, perpendicular to the axis thereof.

An alternative turbine construction is shown in FIGS. 3 and 4, parts similar to those shown in FIGS. 1 and 2 having the same reference numerals with the suffix a. The turbine discs 44a have scalloped rims, each scalloped portion forming a smooth curve between the attachment points of adjacent blades 45a. It will be appreciated that the portions of each disc 44a removed to form the scallops constitute low stress areas of the disc.

The scalloped portions are filled in by respective suitably shaped members 76 of high temperature resistant honeycomb or other cellular material, each member 76 extending through corresponding scalloped portions of adjacent discs 44a and being suitably bonded thereto to thereby extend along the full length of rotor 43a which is comprised of a plurality of axially aligned identical discs 44a. The cells of the honeycomb material constitute a plurality of ducts 55a whose axes are curved so as to extend approximately parallel to the mean chord lines of the rotor blades 45a. The honeycomb material is also arranged so that each of the ducts 55a communicates between the interior of the rotor 43a and the radially outer surface of the rotor 43a so as to discharge cooling fluid in approximately the same direction as, but at a small angle to, the direction of flow of the working fluid of the turbine 16a which forms a layer of the cooling air covering substantially the whole of the external surface of the rotor 43a.

The passages 50a communicate with several of the ducts 55a, as shown at 74, while a similar arrangement (not shown) is used to establish communication between passages 52a and the ducts 55a.

It will also be appreciated that the embodiment of the invention hereinbefore described produce layers of cooling air which cover substantially the whole of the surfaces defining the flow duct within the turbine 16. The gas turbine engine may therefore be operated at a comparatively high temperature, thus producing more power for a given mass flow. The use of honeycomb members 70 offers the additional advantage of light weight.

Various modifications to the described engine are possible. Thus the temperature of the cooling fluid leaving the chambers 22 may be varied or controlled by incorporating secondary combustion equipment in the chambers 22, instead of or in addition to, providing the heat exchanger coils 24. It will further be appreciated that the invention is applicable to gas turbines other than that described, for example gas turbines for use in gas turbine engines adapted to operate on a helium or carbon dioxide closed cycle.

We claim:

1. A gas turbine comprising a rotor, a row of equiangularly spaced apart rotor blades secured to the rotor, said rotor having relatively low stress areas between adjacent rotor blades, first cooling fluid supply means adapted to direct cooling fluid at the edge of each rotor blade so as to form on each rotor blade a layer of cooling fluid which extends over at least a major portion of the surface of the rotor blade and second cooling fluid supply means adapted to direct cooling fluid into the spaces between adjacent rotor blades so as to form a layer of the cooling fluid on those parts of the surface of the rotor between the rotor blades, wherein the second cooling fluid supply means includes a honeycomb type structure in said low stress areas of the rotor between adjacent rotor blades extending approximately parallel to the mean chord lines of the rotor blades, said honeycomb type structure communicating with the interior of the rotor.

2. A gas turbine having a rotor having a radially outer surface, a row of equiangularly spaced apart rotor blades secured to the rotor, said rotor having relatively low stress areas between adjacent rotor blades, a plurality of discrete slots positioned in the radially outer surface of the rotor in front of the leading edge of each rotor blade, each slot communicating with the interior of the rotor and arranged to receive a supply of cooling fluid, a honeycomb structure located in each of said relatively low stress areas, said honeycomb structure comprising a plurality of ducts within the rotor communicating between the interior and exterior of the rotor, the ducts extending substantially parallel to the mean chord lines of the blades and arranged to receive a supply of cooling fluid, the supply of cooling fluid to said slots and said ducts being from a direction upstream of said slots and said ducts respectively whereby the outer surfaces of said blades and the spaces between said adjacent blades are exposed to cooling fluid.

3. A gas turbine as claimed in claim 2 in which the rotor has at least one further row of equiangularly spaced apart rotor blades secured thereto downstream of said first mentioned row, the rotor blades of the further row being arranged to receive the cooling fluid which has passed over the rotor blades of the first mentioned row.

4. A gas turbine as claimed in claim 1 in which said rotor has scalloped portions on its periphery, said scalloped portions defining said low stress areas of said rotor.

5. A gas turbine as claimed in claim 4 in which said scalloped portions are formed by a smooth curved surface between adjacent blades.

* * * * *